(12) United States Patent
Poli et al.

(10) Patent No.: US 7,380,817 B2
(45) Date of Patent: Jun. 3, 2008

(54) ASSEMBLY FOR RETAINING AN AIRBAG MODULE TO A STEERING WHEEL

(75) Inventors: Valerio Poli, Villa Bartolomea (IT);
Roberto Ridolfi, Tregnago (IT);
Andrea Amselmi, Tregnago (IT);
Adolfo Ridolfi, Tregnago (IT)

(73) Assignee: Key Safety Systems, Inc., Sterling Heights, MI (US)

( * ) Notice: Subject to any disclaimer, the term of this patent is extended or adjusted under 35 U.S.C. 154(b) by 23 days.

(21) Appl. No.: 11/674,314

(22) Filed: Feb. 13, 2007

(65) Prior Publication Data

US 2007/0152428 A1 Jul. 5, 2007

Related U.S. Application Data

(63) Continuation-in-part of application No. 11/092,279, filed on Mar. 29, 2005.

(51) Int. Cl.
*B60R 21/16* (2006.01)
(52) U.S. Cl. ............... 280/731; 200/61.54; 200/61.55; 200/61.57
(58) Field of Classification Search ............ 280/728.2, 280/731; 200/61.54, 61.55, 61.57
See application file for complete search history.

(56) References Cited

U.S. PATENT DOCUMENTS

| | | | |
|---|---|---|---|
| 5,685,559 A | | 11/1997 | Cuevas |
| 5,738,369 A | * | 4/1998 | Durrani ..................... 280/731 |
| 5,882,032 A | * | 3/1999 | Fischer .................... 280/728.2 |
| 6,029,992 A | * | 2/2000 | Vendely et al. .......... 280/728.2 |
| 6,119,545 A | * | 9/2000 | Hosoi et al. .................. 74/552 |
| 6,676,155 B2 | | 1/2004 | Grosch et al. |
| 6,682,092 B2 | * | 1/2004 | Schutz et al. ............... 280/731 |
| 6,830,263 B2 | * | 12/2004 | Xu et al. .................... 280/731 |
| 7,052,035 B2 | * | 5/2006 | Kreuzer ................... 280/728.2 |
| 7,121,581 B2 | * | 10/2006 | Xu et al. .................... 280/731 |
| 2002/0074781 A1 | | 6/2002 | Derrick |
| 2003/0025308 A1 | | 2/2003 | Hirzmann |
| 2003/0080542 A1 | | 5/2003 | Grosch et al. |
| 2003/0197355 A1 | | 10/2003 | Bohn et al. |

(Continued)

FOREIGN PATENT DOCUMENTS

EP 1491412 A1 12/2004

(Continued)

*Primary Examiner*—Toan To
(74) *Attorney, Agent, or Firm*—Lonnie Drayer

(57) ABSTRACT

As improved airbag module retention assembly for attachment to a steering wheel has an airbag module housing having an airbag cover, an internally stored airbag. The airbag module housing has two pairs of attachment legs. A base plate assembly has a base plate with a pair of mounting brackets pivotally attached at ends of the mounting brackets to the hinge supports projecting from the base plate and being linearly movable relative to the hinge supports. A resilient member such as a spring returns the airbag module housing to a resting position upon activation of a horn. The resilient member is interposed between one mounting bracket and the base plate. The pair of mounting brackets are connected by a pin and a slot. Each end of a mounting bracket is attached to an attachment leg of the airbag module housing. Movement of the airbag module housing assembly is constrained to a displacement parallel to the axis of rotation of the steering wheel.

20 Claims, 11 Drawing Sheets

U.S. PATENT DOCUMENTS

2004/0169358 A1  9/2004  Fujita
2005/0151354 A1* 7/2005  Sugimoto .................. 280/731
2005/0230943 A1* 10/2005 Thomas ..................... 280/731
2006/0208470 A1* 9/2006  Tsujimoto et al. .......... 280/731

FOREIGN PATENT DOCUMENTS

EP  155170 A2   1/2005
EP  1595754 A   11/2005

* cited by examiner

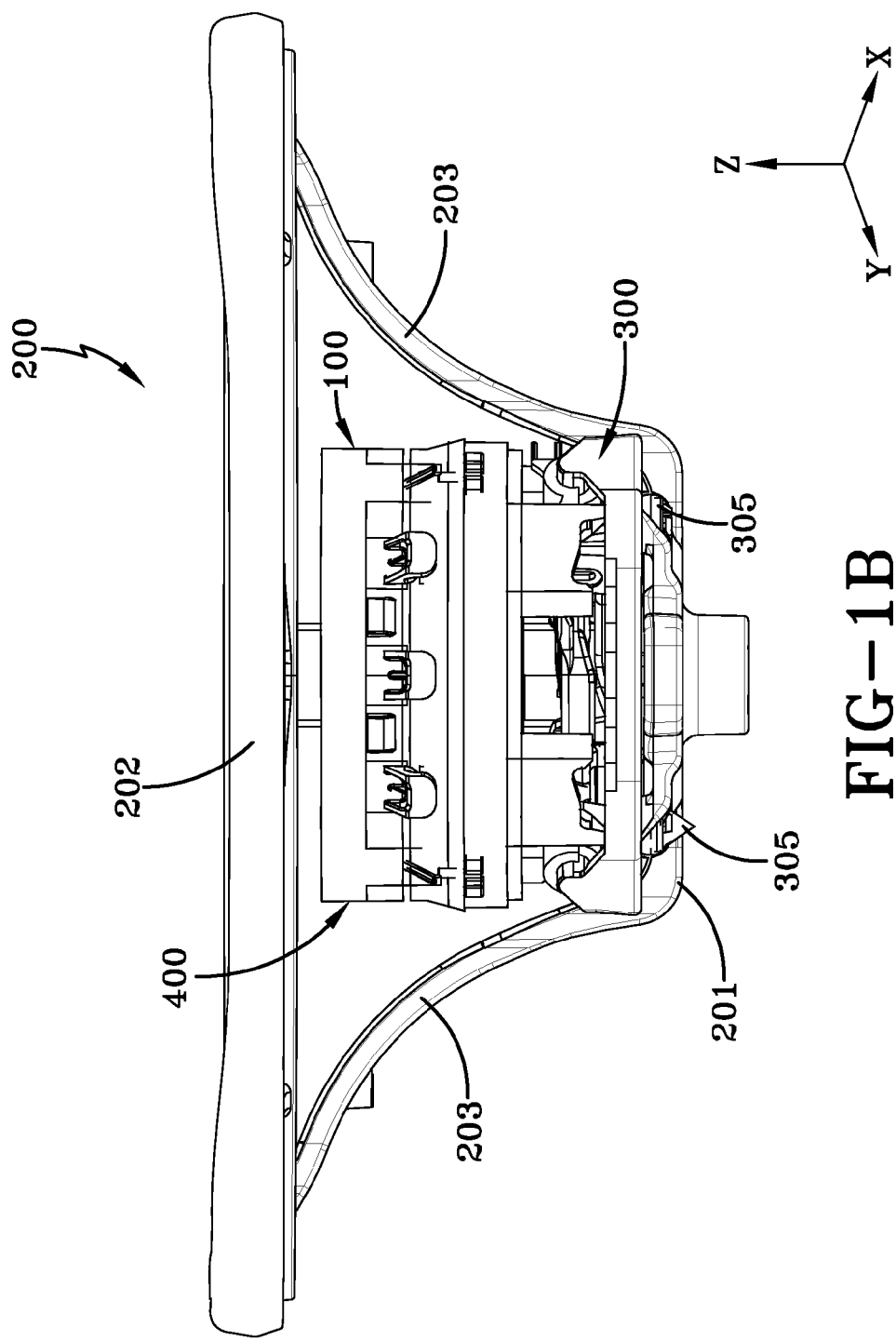

ASSEMBLY FOR RETAINING AN AIRBAG MODULE TO A STEERING WHEEL

RELATED APPLICATIONS

This application is a continuation in part of U.S. patent application Ser. No. 11/092,279 entitled "Assembly For Retaining an Airbag Module to a Steering Wheel" filed on Mar. 29, 2005 which claims foreign priority of European Patent Application 04425334.2 filed on May 10, 2004.

FIELD OF THE INVENTION

The present invention relates to an assembly for retaining an airbag module to a steering wheel.

BACKGROUND OF THE INVENTION

Assemblies are known for installing an airbag module within a steering wheel of a motor vehicle. Airbag modules are commonly secured by pins, screws, nuts, interlocking teeth, or similar attachments, in an appropriate housing coupled to a steering wheel frame. If the airbag module serves as an ancillary device for actuation of the horn of the vehicle, the airbag module needs to be moveable between a resting position and a working position at which the airbag module cooperates with suitable devices provided within the housing for the actuation of the horn. In this case, the vehicle driver operates the horn by pressing the airbag module, directly or indirectly through a cover into the working position. An airbag module of this type is usually supported by one or more resilient members that return the airbag module to a resting position after its operation.

DISCUSSION OF THE PRIOR ART

U.S. Pat. No. 6,676,155 B2 discloses an airbag module that moves in cooperation with a support lockable with a steering wheel frame. The airbag support is concentrically surrounded by a horn ring on which electrical contacts are arranged for actuation of the horn. Springs are provided on the region of the outer periphery of the support. The support can be moved against the bias of the springs in the direction of the horn ring, to actuate the horn. Due to the restoring force of the springs, the support and the airbag module are moved back into their resting position upon actuation of the horn.

Assemblies similar to that disclosed in U.S. Pat. No. 6,676,155 B2 are commonly provided for the installation of airbag modules within steering wheels, wherein a plurality of electrical contacts, or alternatively a horn ring, are arranged at the periphery of the airbag module for actuation of the horn, and wherein resilient members bias displacements of the airbag module. In particular, some of these assemblies provide snap coupling of the airbag module to its housing within a steering wheel or to a support element fitted to the steering wheel. Snap coupling allows an easy and quick in-line assembly of the airbag module within a steering wheel with no need for screws, pins, nuts or similar joining means. An example of snap coupling is disclosed in U.S. Pat. No. 6,676,155 B2.

Assemblies of the prior art have several drawbacks. For example, when pressing the airbag module for actuation of the horn, due to the arrangement of the resilient members at the periphery of the airbag module, it typically tilts laterally. The driver usually pushes the airbag module, directly or through a cover, in an area on the periphery of the airbag module. The force is applied to the periphery of the airbag module, resulting in a moment that pivots the airbag module around a resilient member. In this way the airbag module slants toward the area on the periphery of the airbag module. For this reason, i.e. to permit lateral movement of the airbag module, relatively large gaps need to be provided between the steering wheel, or the airbag module housing, and the airbag module itself, resulting in non-aesthetic matching between these components.

Due to the area on the periphery of the airbag module pressing of the airbag module being applicable through several push buttons, or pressing areas, uniformly arranged on the steering wheel, traditional assemblies need a plurality of electrical contacts, located around the periphery of the airbag module to permit satisfactory horn activation whatever push button/area the driver chooses. Alternatively, traditional assemblies provide a horn ring that is a circular electrical contact surrounding the airbag module periphery. None of these designs provides equal horn activation loads between different pressing areas. This means that a driver experiences unequal horn performance, such as different duration and/or intensity, at different areas pressed on the steering wheel during activation of the horn. Pivoting of the airbag module causes lateral movements of the airbag module itself and, in this way, also causes airbag module stroke amplifications which, during assembling of the steering wheel, have to be counterbalanced by increasing the gaps between the airbag module and the steering wheel or the housing.

In view of above, assembling of steering wheels provided with traditional assemblies for installing airbag modules, which also are to activate the vehicle horn, is often time consuming and expensive.

SUMMARY OF THE INVENTION

The present invention provides a retaining assembly for airbag modules associated with steering wheels that solves the above problems of the prior art assemblies, also allowing to minimize gaps between the airbag module and the related steering wheel and to have equal horn activation loads regardless of the location on the airbag module that is pressed by the driver.

The present invention also provides a retaining assembly for airbag modules, in particular a snap-in retaining assembly, which permits in line assembly of an airbag module in the relating steering wheel in an easy and quick way.

The present improved invention also provides a base plate assembly that permits an off line assembly to the airbag module and an inline assembly to the steering wheel of the total assembly.

The present improved invention also provides a simple disassembly of the airbag module from the base plate assembly for replacement or repair.

The improved present invention reduces the number of components required to provide an exclusive axial movement of the airbag module.

BRIEF DESCRIPTION OF THE DRAWINGS

FIG. 1B is a side elevation view of steering wheel assembly of FIG. 1A.

DETAILED DESCRIPTION OF THE INVENTION

This application is a continuation in part of U.S. patent application Ser. No. 1/092,279 entitled "Assembly For Retaining an Airbag Module to a Steering Wheel" filed on Mar. 29, 2005 which has been published as US 2005/0248135 A1, the entire publication being incorporated herein by reference.

Figure 1A:
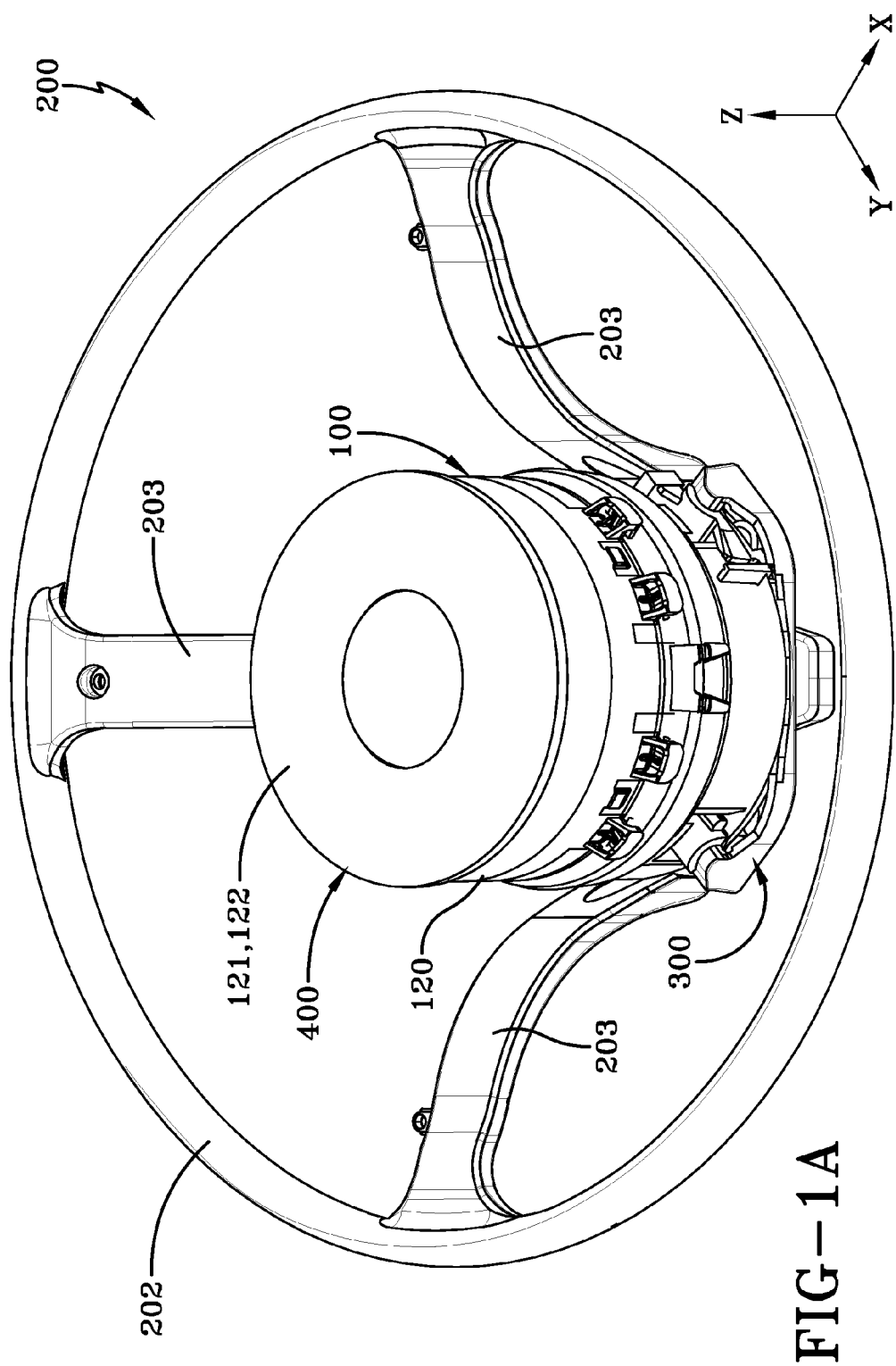
FIG. 1A is a perspective view of a steering wheel with an airbag module assembly connected to a base plate assembly according to the present invention attached directly to the steering wheel.

FIG. 1A shows an improved airbag module retention assembly 400 according to the present invention attached to a steering wheel. The improved airbag module retention assembly 400 includes an airbag module housing 100 with an airbag cover 121 and an internally stored airbag 122 within the housing under the airbag cover 121.

FIG. 1B shows a steering wheel 200 shown in a plan view. The steering wheel 200 includes an outer rim 202 connected to a plurality of spokes 203 that are directed inwardly to a central hub 201. The central hub 201 as shown has a base plate assembly 300 that is attached to the central hub by means for attachment such as threaded fasteners, spring clips or pins 305 at a plurality of locations. The base plate assembly 300 is connected to an airbag module housing 100. The airbag module housing 100 holds an airbag 122 and an airbag cover 121 shown in FIG. 1A to form an airbag module assembly 400. The airbag module retention assembly 400 with the airbag module housing 100 and base plate assembly 300 can be assembled offline and later connected to the steering wheel 200 inline by a simple means of pushing the assembly to the central hub snapping it in place without the need of any screws or other attachment features. All of the necessary attachment and locating features are provided in the unique combination of components that will be described hereafter.

Figure 2A:
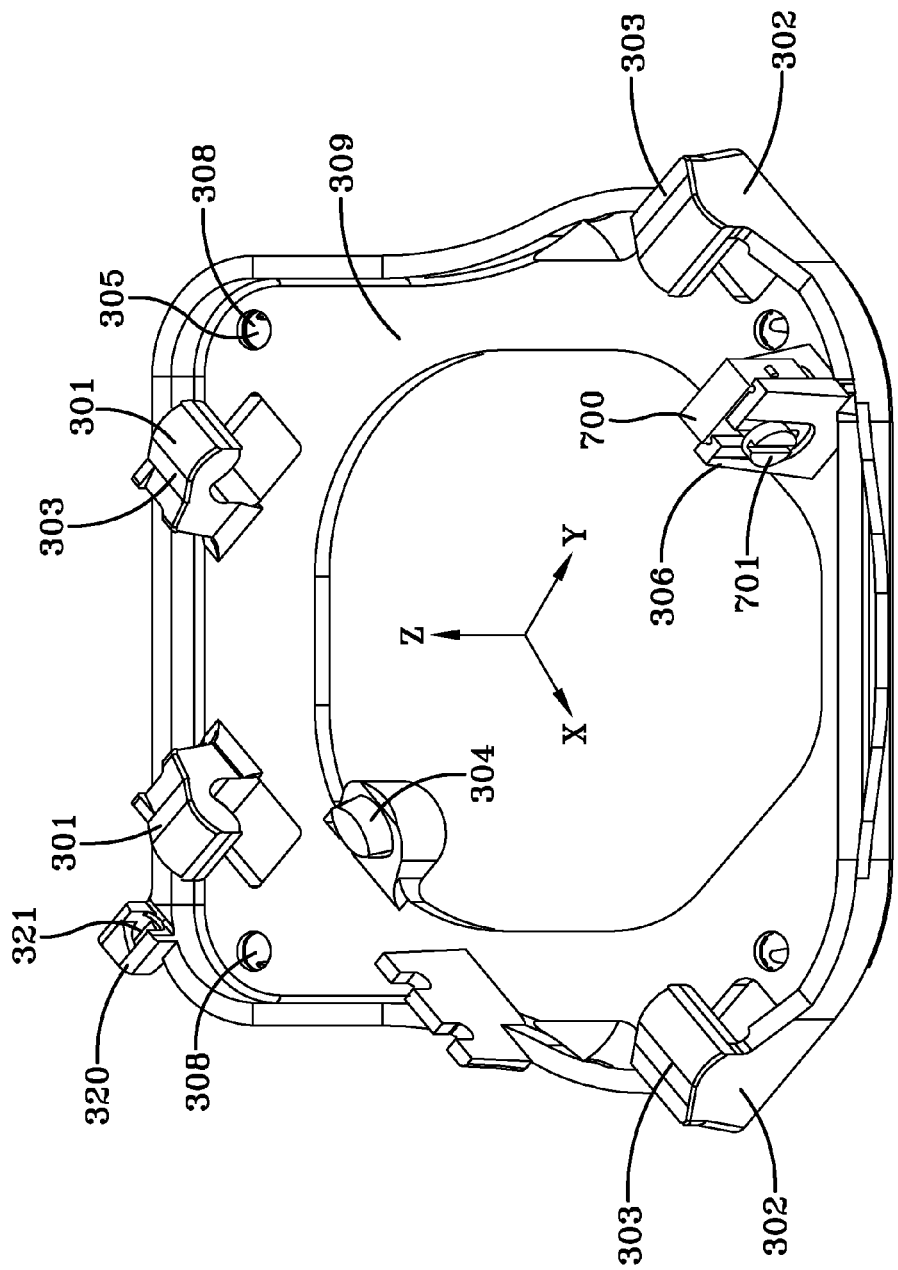
FIG. 2A is a perspective view of the base plate assembly.
Figure 11:
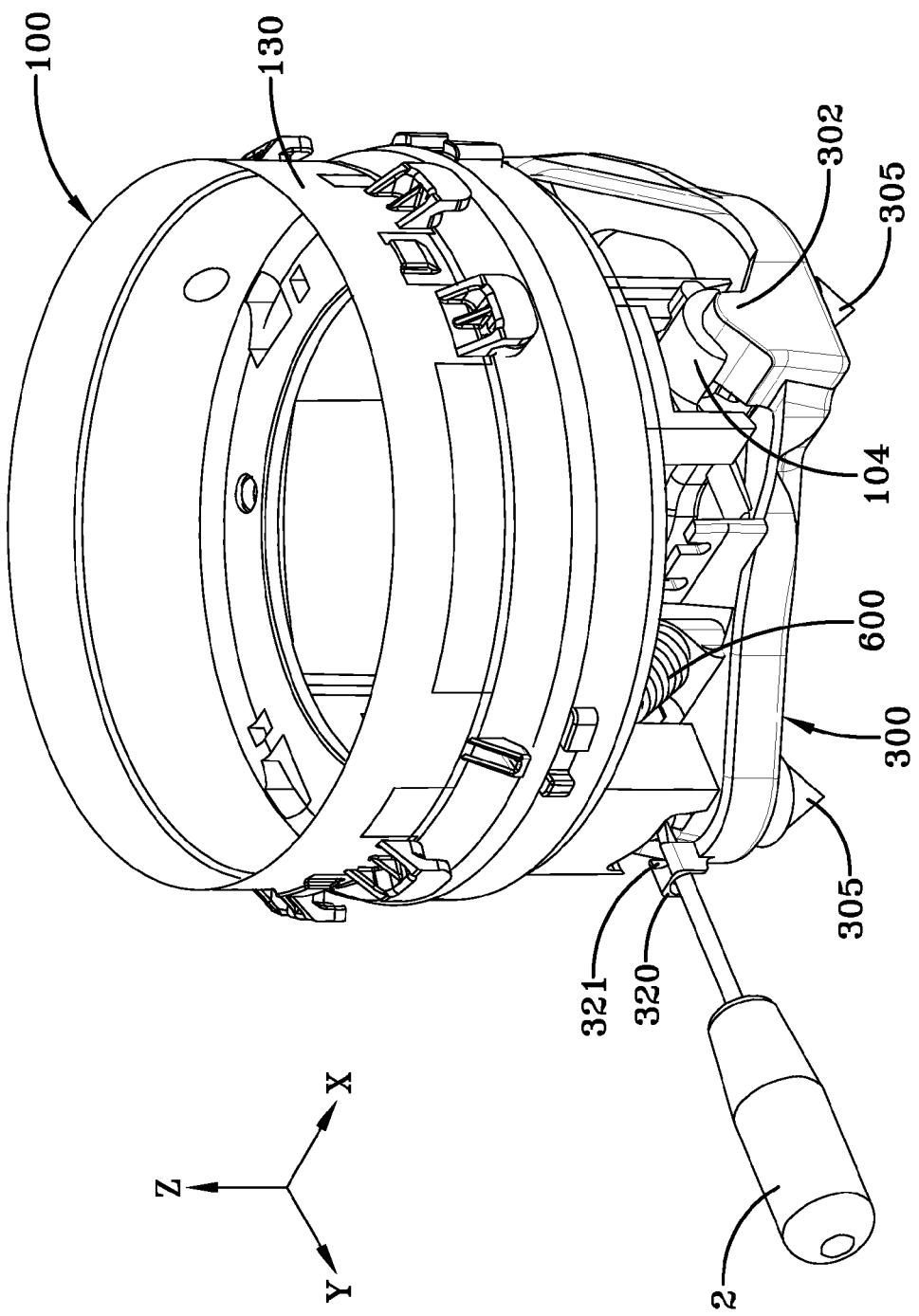
FIG. 11 shows the use of a tool to release the airbag module housing from the base plate assembly.

With reference to FIG. 2A, the base plate assembly 300 is a separate component from the central hub as shown. The base plate assembly 300 has a plurality of hinge supports 301, 302 arranged in pairs extending from a bottom surface of the base plate 309 as illustrated. Each pair of hinge supports 301, 302 will support a mounting bracket as shown in the later figures. The curved surface 303 of each hinge location provides pivotal movement of these mounting brackets 101, 102 along the curved surface 303 provided on each of the hinge locations. Opposite one hinge location 302 is shown a disassembly bracket 320, this disassembly bracket 320 has an opening or slot 321 that will provide easy access to insert a tool 2 to release and remove the airbag module housing 100 once assembled, if it is needed to be replaced or repaired as shown in FIG. 11. In addition a mounting structure 306 is shown directly molded to the base plate assembly 300, this mounting structure 306 is provided to support and locate the horn switch 700 for activating a horn which is securely attached by the fastener 701 as illustrated. In addition, on an incline surface there is a projection 304 that provides a means for locating and retaining a resilient member such as a spring that will provide movement of the module assembly and return movement such that the spring can be compressed upon actuating a horn and will push the entire assembly back along the axis of the depression. This feature will be shown discussed in later figures. Furthermore, there are a plurality of openings 308 from which project retaining means such as spring clips or pins 305 on the underside of the base plate 309 for snap fitting the base plate assembly 300 to the central hub 201. These retaining spring clips or pins 305 are shown in each corner of the base plate 309 of the base plate assembly 300 as illustrated.

Figure 2B:
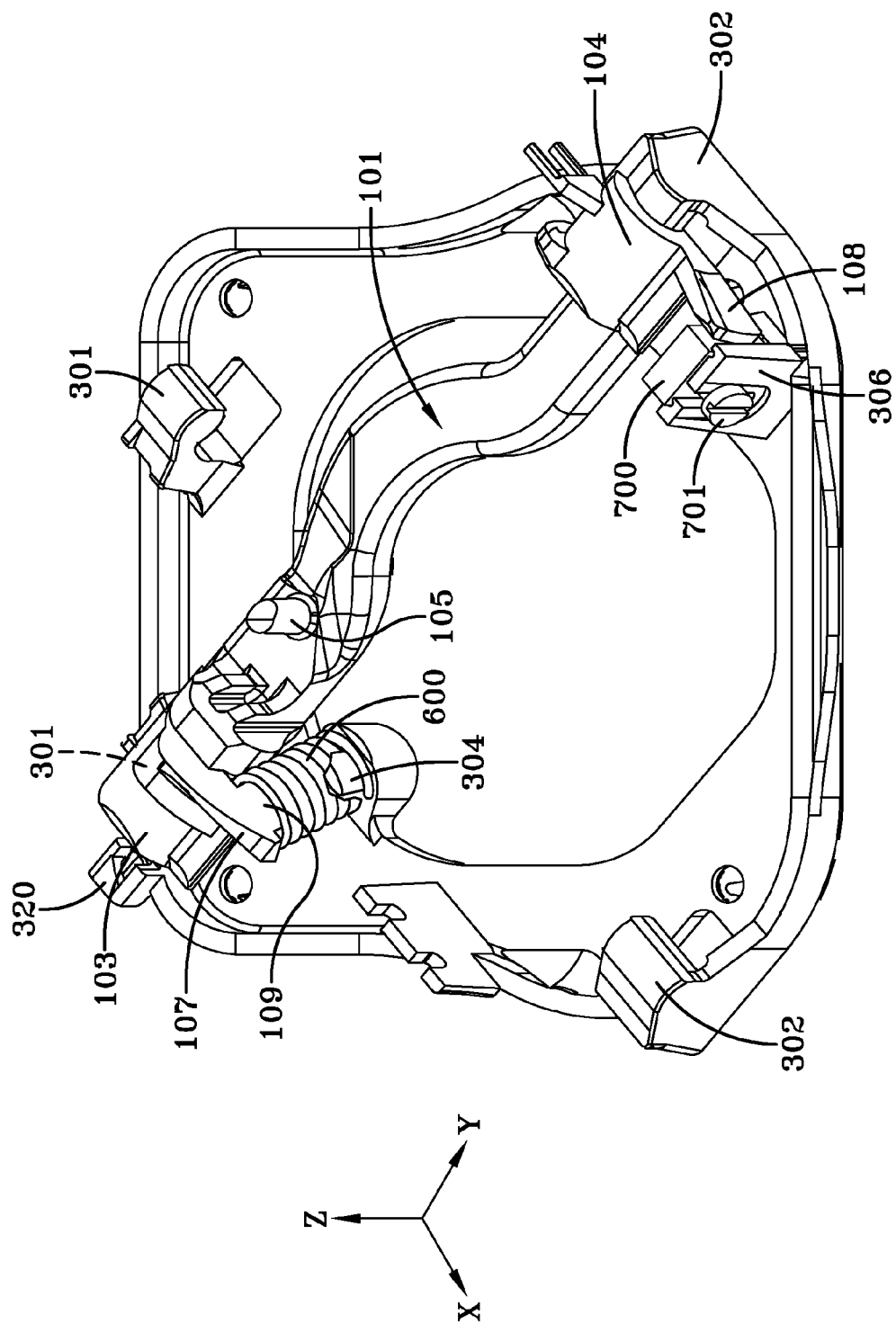
FIG. 2B is a perspective view of the base plate assembly with a first mounting bracket shown pivotally attached at both ends to the base plate assembly and having a spring means connected thereto.

With reference to FIG. 2B, a first mounting bracket 101 is shown placed over the hinge supports 301, 302 at the ends 103, 104 of the bracket. This first mounting bracket 101 includes a projecting pin 105 that provides cooperative movement from a second bracket that will be shown assembled in FIG. 2C. This projecting pin 105 provides cooperative movement between the two brackets as will be illustrated. An integral cantilevered arm structure 107 is located near the end 103 of first mounting bracket 101 and projects in a cantilevered fashion and has an inward directed guide arm 109 onto which a resilient member 600 such as a spring is provided. The resilient member 600 as shown is a coil type spring which is mounted onto the projection 304 and this cantilevered arm 107 on the first mounting bracket 101, this resilient member 600 will provide a return action of the entire airbag module housing 100. When the airbag module housing 100 is depressed, the resilient member 600 will provide a force that will direct the airbag module housing 100 back into its original at rest position when a horn switch 700 is not being depressed or actuated. At the opposite end of the first mounting bracket 101 is a projecting lever arm 108. The lever arm 108 is provided to actuate a horn switch 700 that will be attached at the mounting structure 306 as previously discussed. As shown between the ends 103, 104 the bracket has a midsection with an arcuate curvature 112.

Figure 2C:
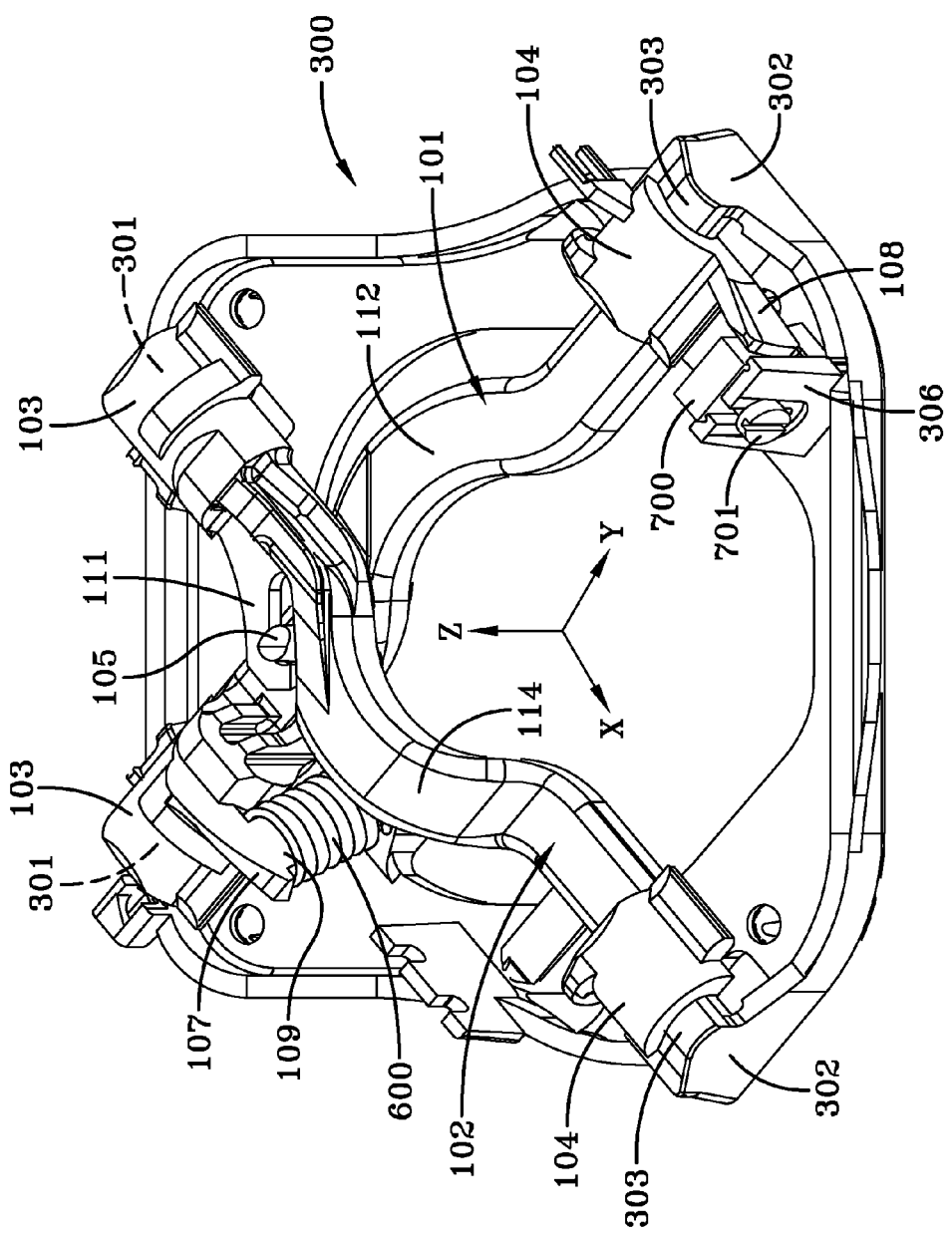
FIG. 2C is a second perspective view of the base plate assembly showing the second mounting bracket shown pivotally attached at both ends to the base plate assembly and having a guide slot for accepting a cam pin projecting from the first mounting bracket.

With reference to FIG. 2C, a second mounting bracket 102 is illustrated and shown attached to the hinge supports 301, 302 as illustrated. This second mounting bracket 102 as shown extends from these two end locations and has a curvature 114 in the midsection of the mounting bracket 102 and includes a slotted portion 111. The slotted portion 111 fits over the projecting pin 105 of the first mounting bracket 101 as illustrated. Each of the ends 103, 104 of the mounting brackets 101, 102 is pivotally placed over curved surfaces 303 of the hinge supports 301, 302 as illustrated. As the airbag module housing 100 is depressed to activate a horn switch 700 these ends 103, 104 pivotally rotate about the curved surface 303 and the action of the first and second mounting brackets 101, 102 provide a cooperative movement that insures the airbag module housing 100 must move in an exclusive axis that is coincidentally parallel with the axis of rotation of the steering wheel. That is the airbag module housing 100 is restrained to a movement parallel to the axis of rotation of the steering wheel.

Figure 3:
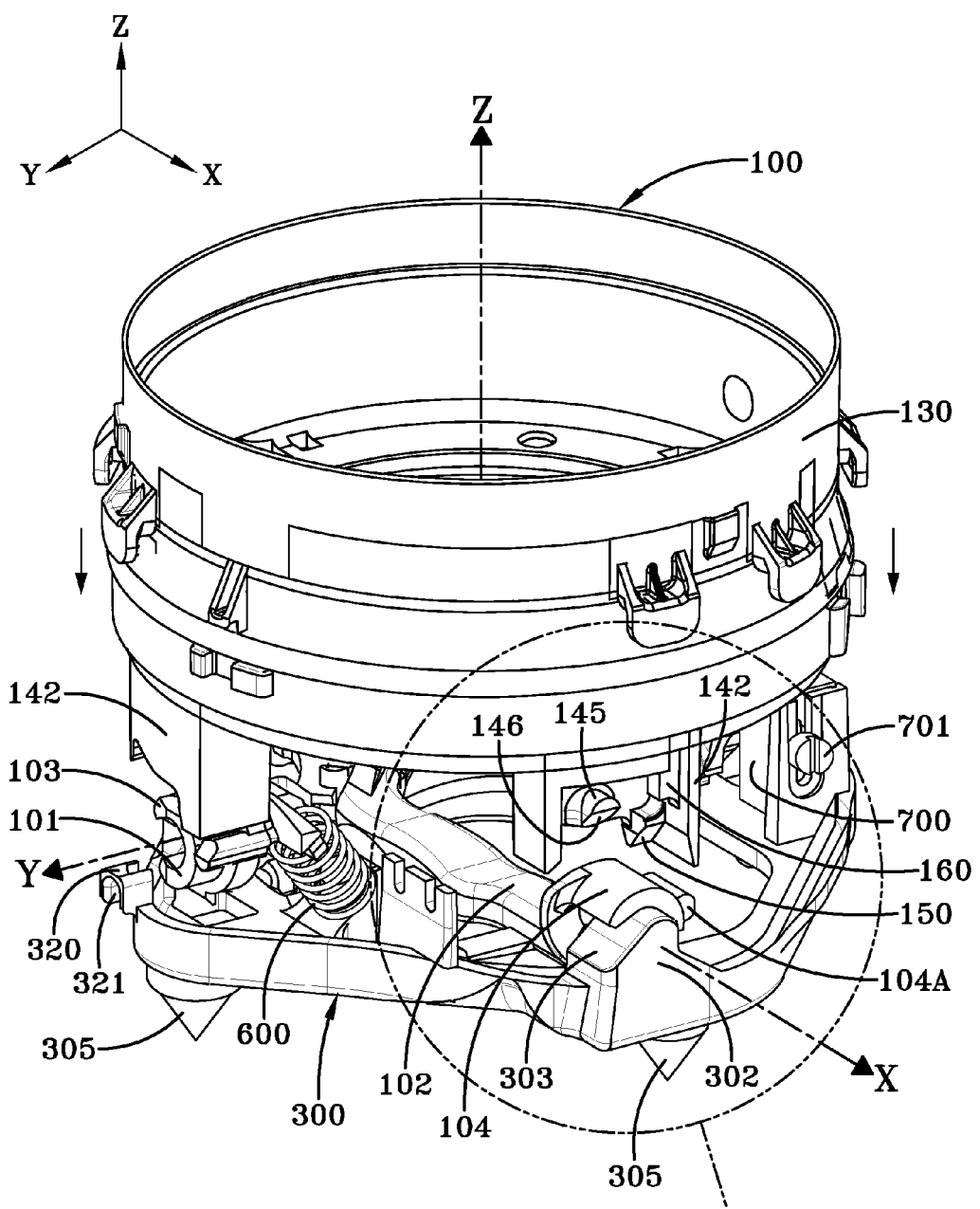
FIG. 3 is a perspective view of the base plate of FIG. 3 with the airbag module housing shown without the airbag or cover shown prior to being attached to the mounting brackets.

With reference to FIG. 3, the airbag module housing 100 is shown prior to being attached to and positioned over the mounting bracket 101, 102 and the base plate assembly 300 which has the two mounting brackets 101, 102 attached. In this position the airbag module housing 100 can be attached or pre-attached to the base plate assembly 300.

Figure 4:
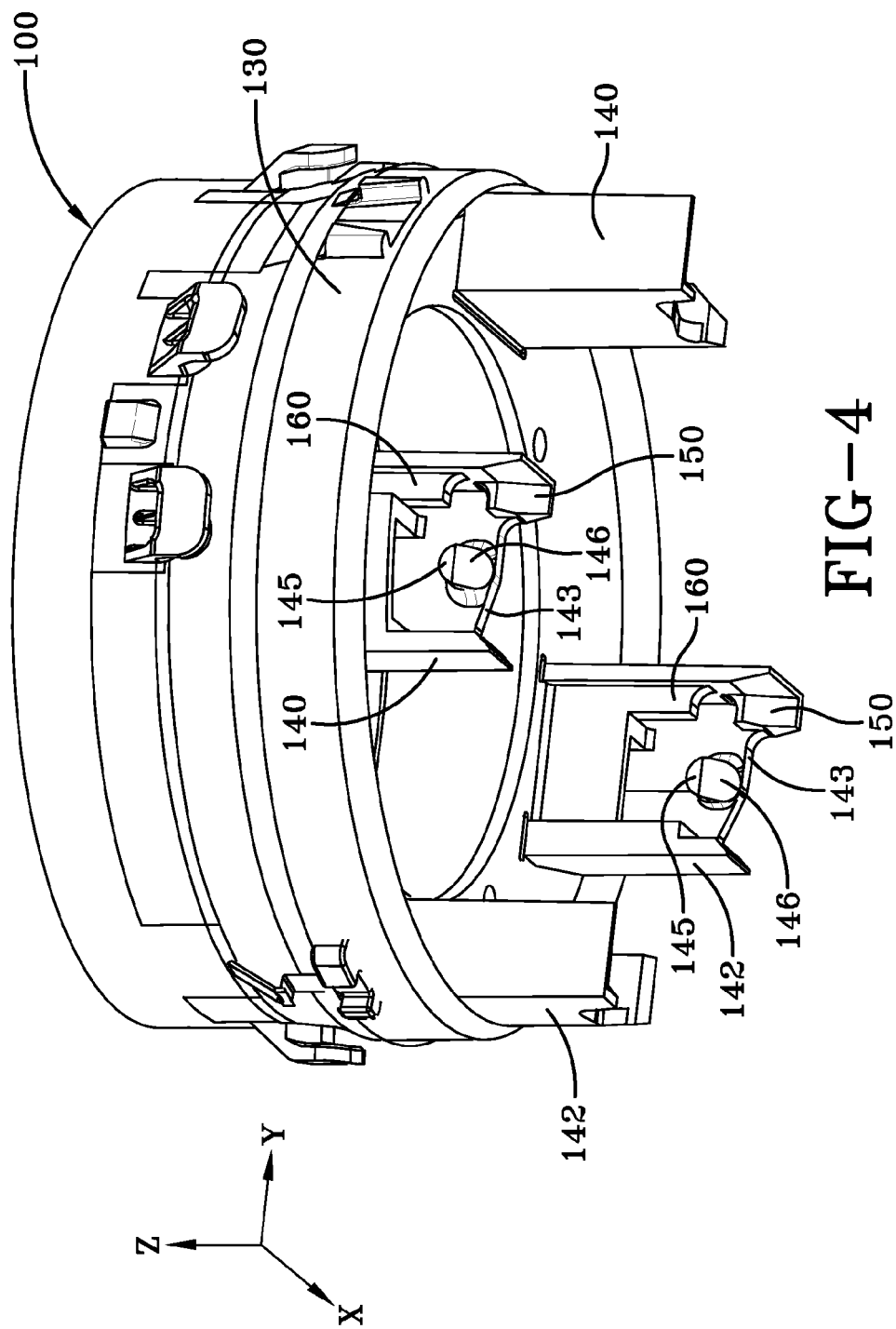
FIG. 4 is a perspective view of the bottom of the airbag module housing showing the attachment legs and mounting features for attachment to the base plate assembly.

With reference to FIG. 4, a perspective looking from the bottom side of the airbag module housing 100 is shown wherein a plurality of attachment legs 140, 142 arranged in two pairs to project and extend downwardly from the main body 130 of the airbag module housing 100. These attachment legs 140, 142 shown in four locations are aligned to fit over the hinged ends 103, 104 of the mounting brackets 101, 102. Each attachment leg 140, 142 has a recessed portion 143 to accommodate an end 103, 104 of a mounting bracket 101, 102. A projecting tooth 145 projects outwardly from each attachment leg 140, 142, as the attachment legs 140, 142 are arranged in diametrically opposite positions and operate in pairs, it is important to notice that the projecting tooth 145 on the one leg will be projecting outwardly from the center of the housing wherein the projecting tooth 145 on the opposite attachment leg 142 will be projecting inwardly toward the center. As shown each projecting tooth 145 has a chamfered surface 146 that pushes the mounting brackets 101, 102 as described below for the ramped tooth 150. The lateral walls of each pair of attachment legs 140, 142 embraces the ends 103, 104 of a mounting bracket 101, 102 to help direct and guide the airbag module housing 100 to slide into proper orientation prior to and after being assembled. As this projecting tooth 145 projects downwardly onto the assembly it guides and helps center the entire assembly so that a proper fitment can be made. A second attachment feature projects from each attachment leg 140, 142 and as shown is a ramped tooth 150. Each ramped tooth 150 is adjacent a wall portion of an attachment leg and is used to push the mounting brackets 101, 102 into position along the curved surfaces 303 of the hinges so the airbag module housing 100 can be attached as is described and shown with reference to FIGS. 5-10.

With reference to FIGS. 5-10, the assembly method of attaching the airbag module housing 100 to the mounting bracket 101, 102 attached to the base plate assembly 300 as illustrated are taken from FIG. 3. While only one attachment leg 140 is shown with regard to the relative movement of the components, it must be appreciated that simultaneously the other three attachment legs 140, 142, are acting in a similar manner, the only exception as previously noted is that the attachment legs 140, 142 cooperate in pairs where one attachment leg 140 will have the projecting tooth 145 and ramped tooth 150 facing axially outward from the housing body while the other attachment leg 142 diametrically opposite an attachment leg 140 will have the projecting tooth 145 and ramped tooth 150 projecting inwardly. Therefore, any movement of the mounting bracket 101, 102 associated with that pair of legs will be pushed and pivoted in the same direction as the housing body is pushed downwardly onto the mounting brackets 101, 102 retained on the mounting base plate assembly 300.

Figure 5:
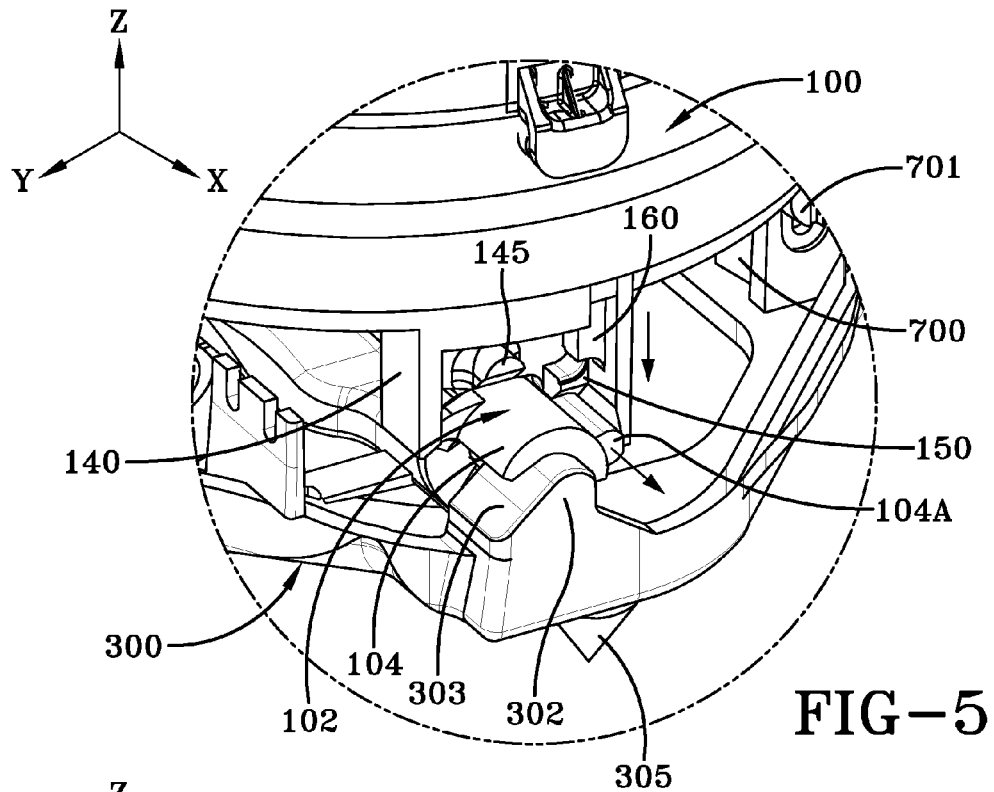
FIGS. 5-10 show the movement of the mounting bracket as a result of the attachment leg being moved towards the base plate assembly to make an attachment thereto, each of the other attachment legs effecting an identical movement, the view being taken from FIG. 3 at the circle shown as a dashed line.

As shown in FIG. 5, as the airbag module housing 100 projects downwardly, the attachment leg 140 pushes against the mounting bracket 102 at the end 104 and moves it outwardly in this figure. The opposite attachment leg 142 would naturally push the bracket 102 inwardly. Similarly due to the slot 111/pin 105 arrangement the mounting bracket 101 would be complimentarily moved in a similar fashion as these features push against the other mounting bracket 101 so both brackets are moved simultaneously due to the complimentary pairs of attachment legs 140, 142 and this slot/pin coupling of the mounting brackets 101, 102.

Figure 6:
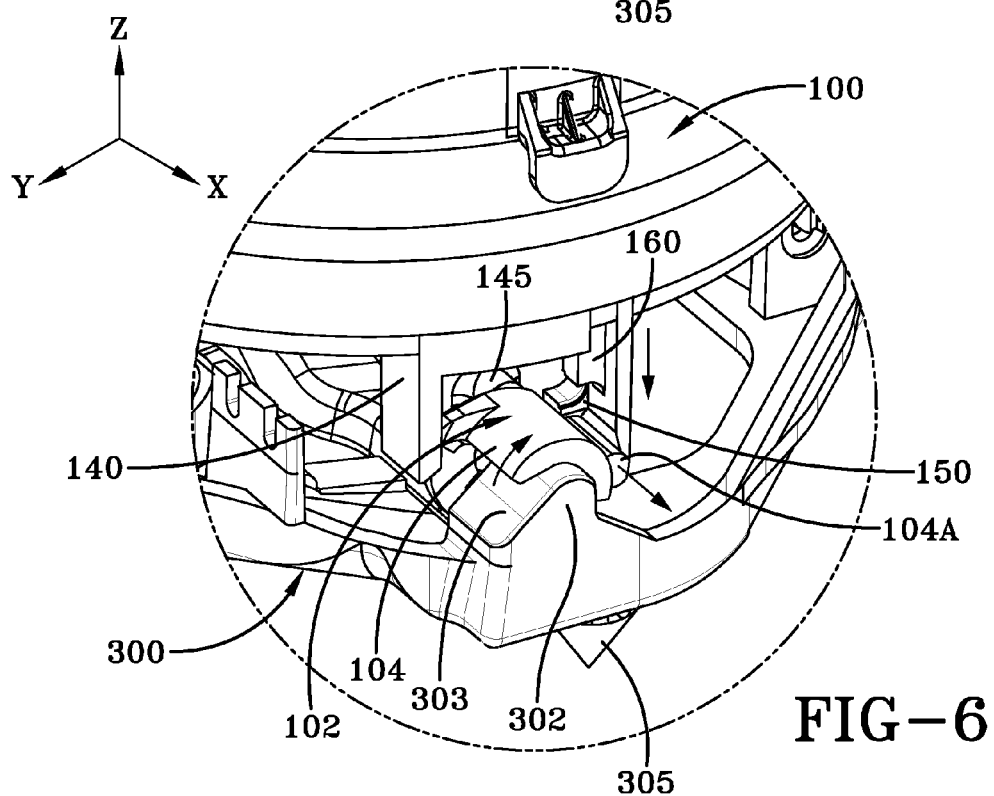

With reference to FIG. 6, as the ramped tooth 150 pushes on the projection 104A of the mounting bracket 102 it forces a pivotal motion at the end 104 about the hinge's curved surface 303 as the mounting bracket 102 continues to move outwardly as shown.

Figure 7:
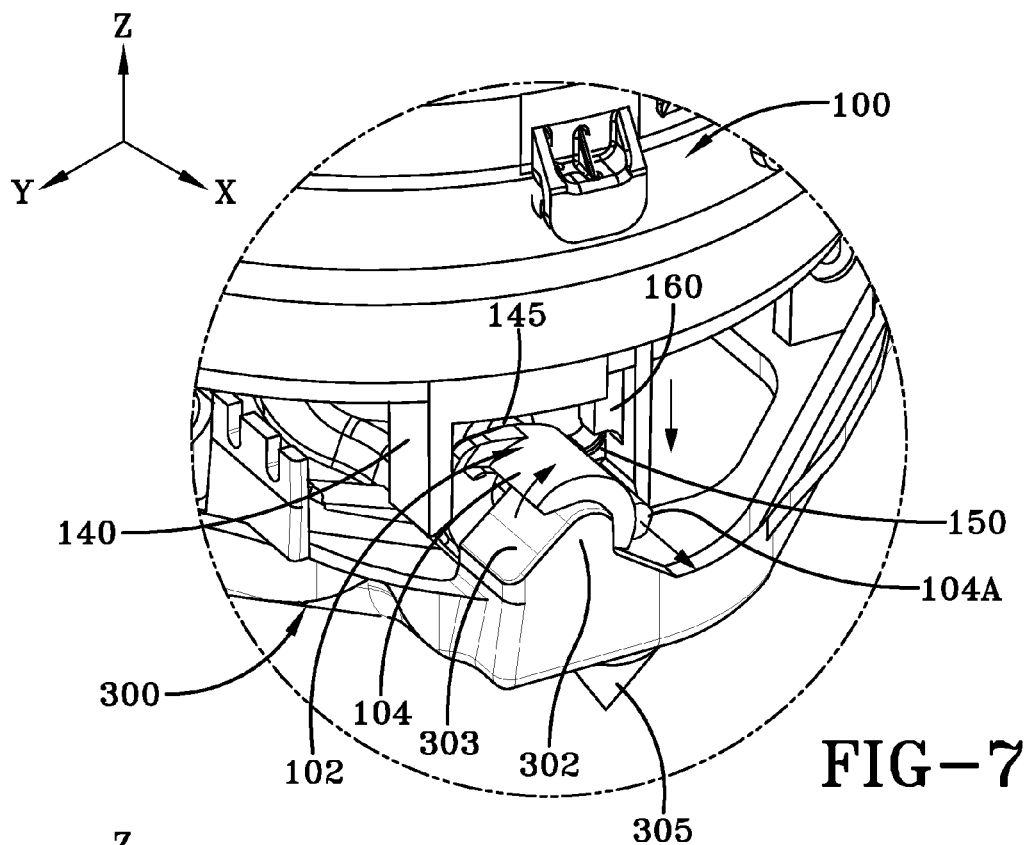
Figure 8:
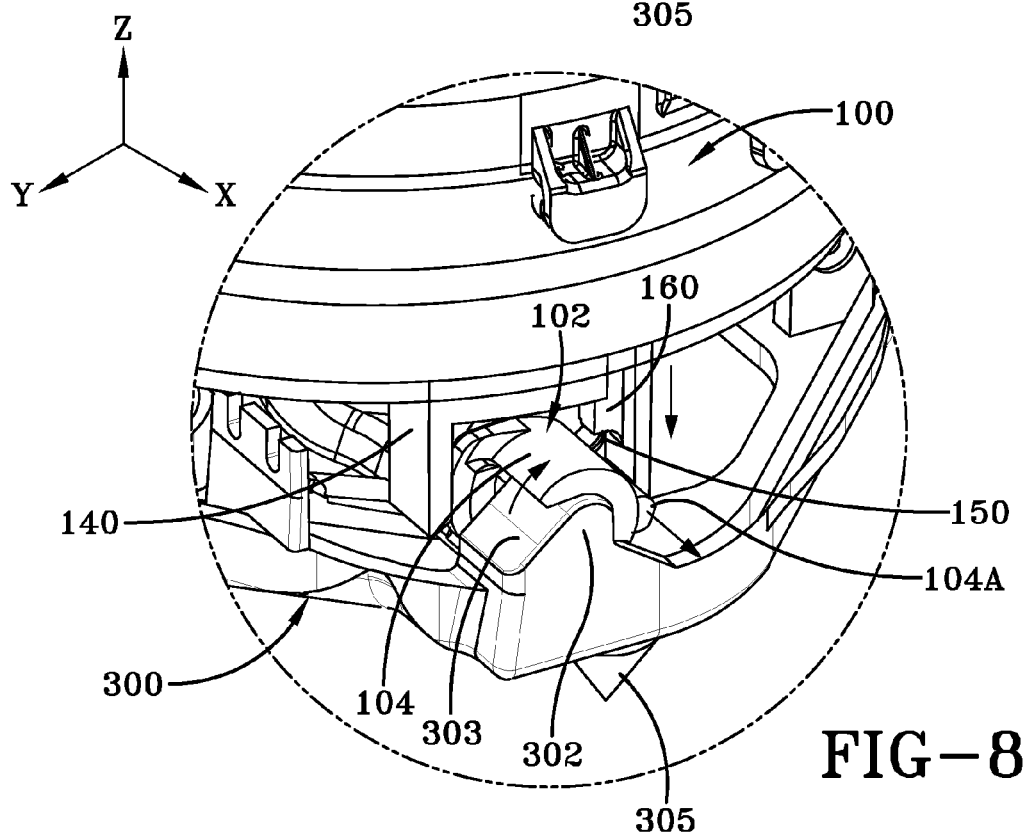

With reference to FIG. 7, this continues until the entire projecting tooth 145 is clear and is able to pass under the hinged mounting bracket 102 due to the rotation and axial movement outward. Once this occurs as shown in FIG. 8, the mounting bracket end 104 moves almost to the end of the projecting hinge supporting portion 302.

Figure 9:
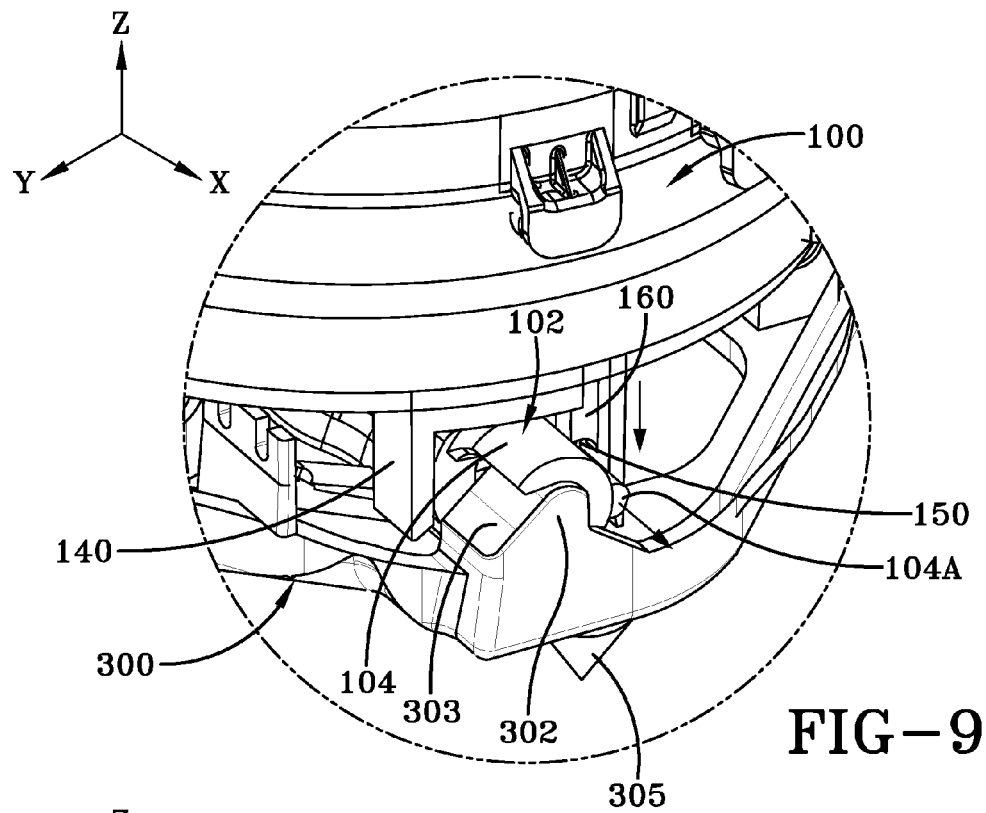
Figure 10:
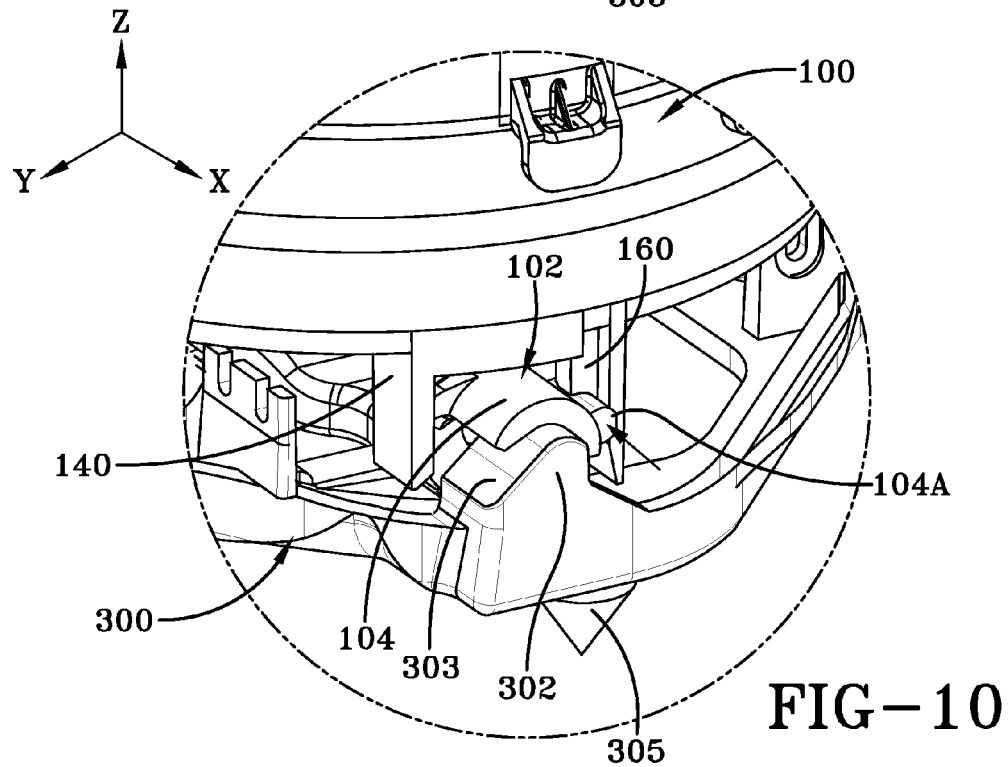

With reference to FIG. 9, the continued push on the airbag module housing 100 forces the ramped tooth 150 to go below the projecting portion 104A of the mounting bracket 102. At this point as shown in FIG. 10 the entire mounting bracket 102 is allowed to move axially inwardly back to a rest position, as this occurs the entire mounting brackets 101, 102 will be able to pivot upwardly along the hinges' curved surfaces 303 as the brackets are rotated back from the constrained bottom position upward to the at rest position. At this point both the projecting tooth 145 and the ramped tooth 150 are securely mounted under the mounting bracket ends 104 and the mounting bracket 102 conveniently is slipped into the slot 160 created between the ramp projection 150 and the wall of the housing as illustrated. This action of attachment is done with a single motion, driving the housing body 130 onto the base plate assembly 300. The base plate assembly 300 is designed to be pre-fixed, by threaded fasteners or snap clips, to the steering wheel 200 after, on the vehicle assembly line the module is snapped into place. The base plate assembly 300 could be obtained produced by being temporarily molded or co-molded to the central hub 21. It is further possible that the sequence as shown the entire airbag module retention assembly 400 can be done offline which is a tremendous advantage in manufacturing and assembly. Once completed, the entire airbag module retention assembly 400 can then be taken to the steering wheel 200 and the projecting snap clip pins 305 can be simply snapped into position once the proper electrical connections are made such that the entire airbag module housing 100 and base plate assembly 300 are attached as an airbag module retention assembly 400 in a single motion. This greatly facilitates the assembly process in the automobile manufacturing plant. As shown in the preferred embodiment the movement of the airbag module housing 100 caused an inbound movement of about 2.5 mm and a pivotal rotation of the mounting brackets of about 15 degrees. This inward travel of 2.5 mm is substantially greater than the normal horn activation travel that averages about 1.1 mm.

The advantage of the present invention is that the integral projecting pin and slot provide a cooperative movement between the two mounting brackets such that pivotal motion about the hinge only can translate into a vertical motion along the z axis which is the axis of rotation of the steering wheel such that the entire airbag module assembly is constrained from moving in any direction other than inwardly and outwardly along this axis. This is true due to the cooperative nature of the projecting legs abutting against the surfaces and being retained in a secure fashion against the ends of the assembly as illustrated.

A second and very important aspect of the invention is that a single resilient member 600 such as a spring directs all motion. This ensures that no loading or weakening of one spring relative to the other can create a deflection. All action is created by this single compression of that single spring and its return force is constant and uniform ensuring that the entire airbag module housing 100 moves without tilting in any fashion due to the constraints of the mounting brackets 101, 102. As shown each mounting bracket 101, 102 has a curvature in an intermediate portion between both ends. This curvature is necessary to avoid interference with the airbag module housing 100.

Once the attachment legs 140, 142 are positioned over the mounting brackets 101, 102, the mounting brackets 101, 102 which prior to this could move independently are now constrained when attachment the legs 140, 142 are hooked into their positions such that the rotations in two orthogonal planes, one through the longitudinal axis of a mounting bracket 101, 102 and the z axis, or the xy axis translations are blocked as the module can only move in the z axis. As previously noted, the resilient member 600 shifts the first bracket through the pin slot dragging the second bracket so each bracket hooks itself up on the attachment legs 140, 142.

As noted on each end of the mounting bracket there is a projecting portion 104A that limits rotation of the mounting bracket relative to the housing when assembled. These projecting portions constrain further movement and insure when the teeth 145, 150 are hooked into position the housing is physically constrained so that it cannot be removed from the assembly.

In FIG. 11 disassembly in order to remove the airbag module housing 100 and its associated components for repair or replacement is accomplished by pushing a screwdriver or tool 2 through the slot 321 in the disassembly bracket 320 and pushing on a mounting bracket 101. By pushing on a mounting bracket 101 this transfers the movement of the other mounting bracket 102 and the ramped tooth 150 of each attachment leg 140, 142 is released from retention of the housing body 130. As the mounting brackets 101, 102 are spring loaded, the entire airbag module housing 100 can move upwardly. At this point the unhooked module housing is free and it will start to eject from the base plate assembly 300 whereupon it can be simply removed for repair or replacement. This feature has the added benefits of creating a very simple way in which to repair or replace an airbag module and is done without the addition of any special components other than to provide an access so that the one mounting bracket can be pushed. This disassembly bracket 320 as shown in one location equally be positioned on the opposite mounting bracket 102 and the same result would occur such that the movement is such that you can move by a simple push on one bracket and the other bracket will cooperatively move in a similar fashion which will permit the release of the projecting tooth 145 and ramped tooth 150 from retaining the assembly. This disassembly movement occurs in a reverse sequence from the assembly movements shown in FIGS. 5-10. By simply changing the directional arrows and looking at FIGS. 10 then 9, 8, 7, 6 and 5 one will recreate the motions created by the screwdriver pushing the mounting bracket inwardly of the slotted opening 321.

As described above the preferred embodiment improved airbag module retention assembly 400 for attachment to a steering wheel 200 has an airbag module housing 100 having an airbag cover 121, an internally stored airbag 122, the airbag module housing 100 having two pairs of attachment legs 140, 142; a base plate assembly 300 having a base plate 309 with a pair of mounting brackets 101, 102 pivotally attached at ends 103, 104 to the hinge supports 301, 302 projecting from the base plate 309 and being linearly movable relative to the hinge supports 301, 302; a resilient member 600 for returning the airbag module housing 100 to a resting position upon activation of a horn, the resilient member 600 being interposed between one mounting bracket 101, 102 and the base plate 309; and wherein the pair of mounting brackets 101, 102 are connected by a pin 105 and a slot 111 and each end 103, 104 of a mounting bracket 101, 102 is attached to an attachment leg 140, 142 of the airbag module housing 100 and movement of the airbag module housing 100 is constrained to a displacement parallel to the axis of rotation of the steering wheel 200.

The base plate assembly 300 has a plurality of projecting retaining means such as clips or pins 305 for attaching to a central hub 201 of a steering wheel 200, preferably the clips or pins 305 are of the spring locking type that snap into the central hub 201. The mounting brackets 101, 102 are linearly moveable relative to the hinge supports as well as being pivotably rotatable about the hinge supports 301, 302. Each pair of attachment legs 140, 142 of the airbag module housing 100 preferably has a projecting tooth 145 that extends outwardly on one attachment leg 140 and on a diametrically opposite attachment leg 142 extends inwardly toward the axis of rotation of the steering wheel and a ramped tooth 150 adjacent a wall of the attachment leg 140 similarly projecting outwardly but spaced from the projecting tooth 145 on one attachment leg 140 and projecting inwardly on the diametrically opposite attachment leg 142 relative to the axis of rotation of the steering wheel. The mounting brackets 101, 102 each have an end 103, 104 with a projecting portion 104A and wherein upon assembly of the airbag module housing 100 downward movement causes the ramped teeth 150 to push the projecting portions 104A a distance sufficient to allow the projecting teeth 145 to pass under an end 103, 104 of the mounting brackets 101, 102 as each mounting bracket linearly moves and pivotably rotates over the underlying curved surface 303 of the hinge supports 301, 302. Continued downward movement allows the ramped tooth 150 to pass under the projecting end portion 104A allowing the resilient member 600 to move the pair of mounting brackets 101, 102 to a return or at rest position when the downward movement is stopped thereby locking each of the projecting end portions 104A of the mounting brackets in a slot formed between the projecting ramp teeth 150 and a projecting portion 160 of the wall on each attachment leg 140, 142.

As previously noted, the base plate 309 has a disassembly bracket 320 having an opening 321 wherein a tool 2 can be passed through the opening to push on an end 103, 104 of one mounting bracket 101, 102 causing a displacement of both mounting brackets 101, 102 sufficient to clear both the projecting teeth 145 and ramped teeth 150 thereby allowing the airbag module housing 100 to be released from the base plate assembly 300. Thereafter the resilient member 600 moves the mounting brackets 101, 102 causing an upward movement of the airbag module housing 100 upon clearing the projecting teeth 145 and ramp teeth 150 so the assembly can be easily replaced or repaired.

The preferred embodiment as described above provides two mechanical members that translate torsional movement to an axial movement. This axial movement or stroke equalizes the amount of pressure required across the surface of the airbag cover 121 to actuate the horn switch 700 and eliminates unwanted lateral movement or rocking that occurs with current horn mechanisms. The assembly insuring only axial movement occurs minimizes the peripheral gaps between the airbag cover 121 and the steering wheel 200. In one embodiment the horizontal gap was reduced to approximately 1.2 mm plus or minus 0.55 mm and the vertical gap was reduced to 2.5 mm plus 0.5 mm with a horn stroke or stroke distance to horn actuation of 1.5 mm plus or minus 0.25 mm. As a result a tremendous reduction in the tolerance stacking resulted greatly reducing the amount of gap that is normally required in conventional assemblies. As shown only one horn switch 700 is required and this entire activation is controlled by only one resilient member 600 such as a coil spring. The assembly is easy to adjust the load required for each application to meet customer specifications because the spring force constant of the single spring can easily be adjusted up or down and there is no concern over matching spring forces when only one spring is required. Also, the acoustical sound emitted from the horn switch 700 is minimized. As shown the cooperative effort of the mechanism wherein the mounting brackets 101, 102 rotate and lock all locations simultaneously eliminates the possibility of having any missing fastener locations by simply pushing the assembly together as was described all the locking features automatically occur and this assembly can be accomplished offline thereafter the entire airbag module retention assembly 400 can be pressed into the central hub 201 of the steering wheel such that a complete assembly is accomplished. The base plate assembly 300 can be pre-fixed to the steering wheel 200. The initial installation force is typically accomplished with approximately 40 newtons. Experimental tests have shown that the force can vary upon assembly depending on the location in which the operator is pressing on the cover; however, the range is typically under 42 newtons to around 35 newtons of force required to make the assembly. Testing of the amount of force required to actuate the horn indicated that using fingers, in other words a point pressing around the periphery of the airbag module housing 100 and across the center range from 25.3 newtons on the high end to as low as 22.7 newtons on the low end and the amount of travel to actuate the horn switch 700 ranged from approximately 1.0 mm to approximately 1.5 mm. When the entire palm of the hand is used to actuate the horn, the horn travel and the amount of force required was in the ranges mentioned. This test data confirmed that the horn assembly as provided creates both an easy to use horn actuation device along with a very easy to assemble airbag module retention assembly 400.

In the foregoing specification, the invention has been described with reference to specific embodiments thereof. It will, however, be evident that various modifications and changes can be made thereto without departing from the broader spirit and scope of the invention as set forth in the appended claims. The specification and drawings are accordingly, to be regarded in an illustrative rather than restrictive sense.

We claim:

1. An improved airbag module retention assembly for attachment to a steering wheel comprising:
   an airbag module housing having an airbag cover attached thereto and an airbag stored therein, the airbag housing having two pairs of attachment legs;
   a base plate assembly having a base plate with a pair of mounting brackets pivotally attached on ends to hinge supports projecting from the base plate and being linearly movable relative to the hinge supports; and
   a resilient member for returning the airbag module assembly to a resting position upon activation of a horn, the resilient member being interposed between one mounting bracket and the base plate;
   wherein the pair of mounting brackets are connected by a pin and a slot and each end of a mounting bracket is attached to an attachment leg of the air bag module housing assembly and movement of the airbag module housing assembly is constrained to a displacement parallel to an axis of rotation of the steering wheel.

2. The improved airbag module retention assembly for attachment to a steering wheel of claim 1, wherein the base plate assembly is attached to a central hub of a steering wheel by means for attachment.

3. The improved airbag module retention assembly for attachment to a steering wheel of claim 1, wherein the base plate assembly is molded to a central hub of a steering wheel.

4. The improved airbag module retention assembly for attachment to a steering wheel of claim 1, wherein the mounting brackets are linearly moveable relative to the hinge supports.

5. The improved airbag module retention assembly for attachment to a steering wheel of claim 1, wherein each pair of attachment legs of the airbag module housing further comprises a projecting tooth that extends outwardly on one attachment leg and on a diametrically opposite attachment leg extends inwardly relative to the axis of rotation of the steering wheel.

6. The improved airbag module retention assembly for attachment to a steering wheel of claim 5, wherein each attachment leg further comprises a ramped tooth adjacent a wall of the attachment leg similarly projecting outwardly relative to the axis of rotation of the steering wheel when assembled but spaced from the projecting tooth on one attachment leg and inwardly on the diametrically opposite attachment leg.

7. The improved airbag module retention assembly for attachment to a steering wheel of claim 5, wherein the mounting brackets each have an end with a projecting portion and wherein downward movement of the airbag module housing assembly causes the ramped teeth to push the projecting portions a distance sufficient to allow the projecting teeth to pass under an end of the mounting brackets as each mounting bracket linearly moves and pivotably rotates over the underlying curved surface of the hinge support.

8. The improved airbag module retention assembly for attachment to a steering wheel of claim 7, wherein continued downward movement allows the ramped tooth to pass under the projecting end portion allowing the resilient member to move the pair of mounting brackets to a return position thereby locking each of the projecting end portions of the mounting brackets in a slot formed between the projecting ramp teeth and a projecting portion of the wall on each attachment leg.

9. The improved airbag module retention assembly for attachment to a steering wheel of claim 8, wherein the base plate further comprises a disassembly bracket having an opening, wherein a tool can be passed through the opening to push on an end of one mounting bracket causing a displacement of both mounting brackets sufficient to clear both the projecting teeth and ramped teeth thereby allowing the airbag module housing to be released from the base plate assembly.

10. The improved airbag module retention assembly for attachment to a steering wheel of claim 1, wherein the resilient member is a coil spring.

11. The improved airbag module retention assembly for attachment to a steering wheel of claim 1, wherein the resilient member moves the mounting brackets causing an upward movement of the airbag module housing assembly upon clearing the projecting teeth and ramp teeth and the wall projection and the slot formed between the ramp teeth and the wall projection.

12. An improved airbag module retention assembly for attachment to a steering wheel comprising:

- an airbag module housing having an airbag cover attached thereto and an airbag stored therein, the airbag housing having two pairs of attachment legs;
- a base plate assembly having a base plate with a pair of mounting brackets pivotally attached on ends to hinge supports projecting from the base plate and being linearly movable relative to the hinge supports; and
- a resilient member for returning the airbag module assembly to a resting position upon activation of a horn, the resilient member being interposed between one mounting bracket and the base plate;
- wherein the pair of mounting brackets are connected by a pin and a slot and each end of a mounting bracket is attached to an attachment leg of the air bag module housing assembly and movement of the airbag module housing assembly is constrained to a displacement parallel to an axis of rotation of the steering wheel as the mounting brackets are linearly moveable relative to the hinge supports.

13. The improved airbag module retention assembly for attachment to a steering wheel of claim 12, wherein the base plate assembly is attached to a central hub of a steering wheel by means for attachment.

14. The improved airbag module retention assembly for attachment to a steering wheel of claim 12, wherein the base plate assembly is molded to a central hub of a steering wheel.

15. The improved airbag module retention assembly for attachment to a steering wheel of claim 12, wherein each pair of attachment legs of the airbag module housing further comprises a projecting tooth that extends outwardly on one attachment leg and on a diametrically opposite attachment leg extends inwardly relative to the axis of rotation of the steering wheel.

16. The improved airbag module retention assembly for attachment to a steering wheel of claim 15, wherein each attachment leg further comprises a ramped tooth adjacent a wall of the attachment leg similarly projecting outwardly relative to the axis of rotation of the steering wheel when assembled but spaced from the projecting tooth on one attachment leg and inwardly on the diametrically opposite attachment leg.

17. The improved airbag module retention assembly for attachment to a steering wheel of claim 15, wherein the mounting brackets each have an end with a projecting portion and wherein downward movement of the airbag module housing causes the ramped teeth to push the projecting portions a distance sufficient to allow the projecting teeth to pass under an end of the mounting brackets as each mounting bracket linearly moves and pivotably rotates over the underlying curved surface of the hinge support.

18. The improved airbag module retention assembly for attachment to a steering wheel of claim 17, wherein continued downward movement allows the ramped tooth to pass under the projecting end portion allowing the resilient member to move the pair of mounting brackets to a return position thereby locking each of the projecting end portions of the mounting brackets in a slot formed between the projecting ramp teeth and a projecting portion of the wall on each attachment leg.

19. The improved airbag module retention assembly for attachment to a steering wheel of claim 18, wherein the base plate further comprises a disassembly bracket having an opening, wherein a tool can be passed through the opening to push on an end of one mounting bracket causing a displacement of both mounting brackets sufficient to clear both the projecting teeth and ramped teeth thereby allowing the airbag module housing to be released from the base plate assembly.

20. The improved airbag module retention assembly for attachment to a steering wheel of claim 12, wherein the resilient member is a coil spring.

\* \* \* \* \*